(12) United States Patent
Boutillier

(10) Patent No.: US 6,815,500 B1
(45) Date of Patent: Nov. 9, 2004

(54) SHOCK VINYLAROMATIC POLYMER BY POLYMERIZATION OF A VINYLAROMATIC MONOMER IN THE PRESENCE OF FREE RADICAL AND A POLYMERIZATION INITIATOR

(75) Inventor: Jean-Marc Boutillier, Pau (FR)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 09/701,831

(22) PCT Filed: May 31, 1999

(86) PCT No.: PCT/FR99/01272

§ 371 (c)(1),
(2), (4) Date: Aug. 31, 2001

(87) PCT Pub. No.: WO99/62975

PCT Pub. Date: Dec. 9, 1999

(30) Foreign Application Priority Data

Jun. 3, 1998 (FR) .......................................... 98 06940

(51) Int. Cl.[7] ......................... C08F 277/00; C08L 51/04
(52) U.S. Cl. ........................... 525/71; 525/86; 525/191; 525/241; 525/242; 525/256; 525/259; 525/263
(58) Field of Search ............................. 525/71, 86, 191, 525/241, 242, 256, 259, 263; 523/201

(56) References Cited

U.S. PATENT DOCUMENTS

| | | |
|---|---|---|
| 4,070,419 A | 1/1978 | Watson |
| 4,146,589 A | 3/1979 | Dupre |
| 4,334,039 A | 6/1982 | Dupre |
| 4,493,922 A | 1/1985 | Echte et al. |
| 4,581,429 A | 4/1986 | Solomon et al. |
| 5,179,166 A | 1/1993 | Demirors |
| 5,264,492 A | 11/1993 | Demirors |
| 5,322,912 A | 6/1994 | Georges et al. |
| 5,334,658 A | 8/1994 | Blumenstein et al. |
| 5,428,106 A | 6/1995 | Schrader et al. |
| 5,627,248 A | 5/1997 | Koster et al. |
| 5,848,651 A | 12/1998 | McSheffrey et al. |
| 5,910,553 A | 6/1999 | McKee et al. |
| 6,262,179 B1 * | 7/2001 | Nicol |

FOREIGN PATENT DOCUMENTS

| | | | |
|---|---|---|---|
| DE | 294493 | | 10/1991 |
| DE | 19637368 | * | 3/1998 |
| EP | 259623 B | | 3/1988 |
| EP | 334715 B | | 9/1989 |
| EP | 726280 A | | 8/1996 |
| EP | 792298 B | | 9/1997 |
| EP | 903354 A | | 3/1999 |
| WO | WO 9736944 | | 10/1997 |
| WO | WO 9746593 | | 12/1997 |

OTHER PUBLICATIONS

Breuer et al. *Structure and Properties of Rubber Reinforced Thermoplastics*, J. Scient. Ind. Res., 40, 659 (1981).
Echte, *Rubber Toughened Plastics*, C. Keith Review Editor American Chemical Society, Washington (1989).
French Search Report for the priority French Application.
U.S. Patent Application No. 08/597,231 (correspondent to EP 726280).
U.S. Patent Application No. 09/157309 (correspondent to EP 903354).

* cited by examiner

*Primary Examiner*—Jeffrey Mullis
(74) *Attorney, Agent, or Firm*—Smith, Gambrell & Russell, LLP

(57) ABSTRACT

The invention concerns a method for preparing a composition comprising a vinylaromatic polymer enclosing rubber nodules. The invention is characterised in that it includes a step for polymerising at least one vinylaromatic monomer in the presence of rubber, a polymerisation initiator and a stable free radical, said step being such that $[F_{SFR} \times (SFR)]:[F_{AMO} \times (AMO)]$ range from 0.05 to 1, $F_{FSR}$ and $F_{AMO}$ representing the functionality of the stable free radical and the initiator respectively and (SFR) and (AMO) representing the molar quantities of the stable free radical and the initiator respectively, The final composition is particularly resistant to shock and/or shiny.

41 Claims, 5 Drawing Sheets

SHOCK VINYLAROMATIC POLYMER BY POLYMERIZATION OF A VINYLAROMATIC MONOMER IN THE PRESENCE OF FREE RADICAL AND A POLYMERIZATION INITIATOR

The invention relates to a process for the preparation of an impact vinylaromatic composition, i.e. a composition comprising a vinylaromatic polymer matrix surrounding rubber nodules.

Patent Application EP 0,726,280 teaches that it is possible to produce an impact polystyrene by polymerizing a vinylaromatic monomer in the presence of a polybutadiene and of a stable free radical.

Patent EP 0,048,389 teaches that it is possible to obtain an impact polystyrene in which the nodules are essentially in the form of capsules, provided that a styrene-butadiene copolymer is used as the rubber.

The process according to the invention involves a step of polymerizing at least one vinylaromatic monomer in the presence of rubber, of a polymerization initiator and of a stable free radical, the said step being such that if (SFR) represents the number of moles of stable free radical in the polymerization mixture, if $F_{SFR}$ represents the functionality of the stable free radical, i.e. the number of sites on the same molecule of stable free radical having the stable free radical state, if (INIT) represents the number of moles of polymerization initiator in the polymerization mixture, and if $F_{INIT}$ represents the functionality of the initiator, i.e. the number of sites having the free radical state that each molecule of initiator is capable of generating, then:

$$0.05 < \frac{F_{SFR} \times (SFR)}{F_{INIT} \times (INIT)} < 1,$$

and preferably:

$$0.05 < \frac{F_{SFR} \times (SFR)}{F_{INIT} \times (INIT)} < 0.5.$$

As an example of a stable free radical having a functionality $F_{SFR}$ of 1, mention may be made of a molecule represented by:

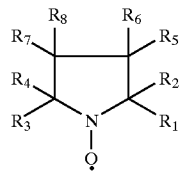

in which the groups R1, R2, R3, R4, R5, R6, R7 and R8 represent alkyl radicals.

As an example of a stable free radical having a functionality $F_{SFR}$ of 2, mention may be made of a molecule represented by:

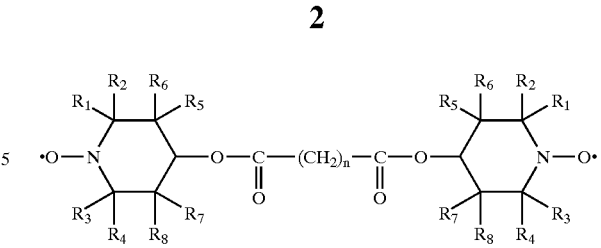

in which the groups R1, R2, R3, R4, R5, R6, R7 and R8 represent alkyl radicals and n represents a non-zero integer.

As an example of an initiator having a functionality $F_{INIT}$ of 2, mention may be made of dicumyl peroxide.

As an example of an initiator having a functionality $F_{INIT}$ of 4, mention may be made of ethyl 3,3-di(tert-amylperoxy) butyrate which may be represented by:

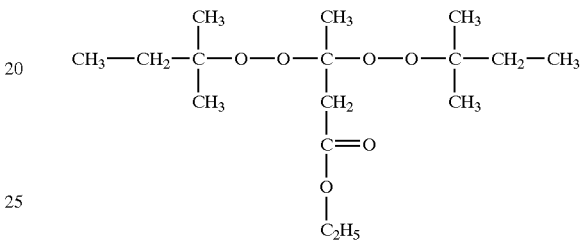

as it contains two —O—O— links each capable of generating two sites having the free radical state, namely —O*.

Using one particular $[F_{SFR} \times (SFR)]/[F_{INIT} \times (INIT)]$ ratio, a polymerization range is defined within which it is possible to control and choose the morphology and the distribution of the sizes of nodules in the impact composition.

In addition, the process according to the invention is rapid, despite the use of a stable free radical which generally tends to slow down the polymerization.

The following morphologies of rubber nodules may be obtained:

the "salami"-type morphology, which means that the rubber particle contains several generally approximately spherical, but non-concentric, vinylaromatic polymer occlusions;

the "labyrinth"-type morphology, which means that the rubber particle contains several elongate, curved, generally non-spherical and generally unsymmetrical vinylaromatic polymer occlusions;

the "onion"-type morphology, which means that the rubber particle is approximately spherical and contains, concentrically with respect to itself, several vinylaromatic polymer occlusions contained one within another; and the "capsule"-type morphology, which means that the generally approximately spherical rubber particle contains a single vinylaromatic polymer occlusion.

The "salami", "labyrinth" and "onion" morphologies may be called "multi-occlusion" morphologies. In general, they are substantially coarser than the capsules.

These morphologies in particular impinge on the impact properties and the gloss of the final compositions.

When, for a given rubber and a given rubber content, the grafting is less, the nodules are essentially in salami form.

Within the above-defined polymerization range, it is possible, for a given rubber and a given rubber content, to increase the proportion of nodules in labyrinth form, in onion form or in capsule form by increasing the grafting of the rubber.

It is possible to further increase the proportion of nodules in capsule form by further increasing the grafting of the rubber. It is possible to promote the formation of capsules compared with the other morphologies by using a rubber of lower viscosity.

The advantages of the invention, in particular the possibility of obtaining a high proportion of nodules in labyrinth, onion or capsule form, or even a morphology essentially in capsule form, may be obtained from a rubber not comprising a polymerized vinylaromatic monomer unit and may be obtained by using a homopolybutadiene as the rubber.

The expression "grafting of the rubber" should be understood to mean the grafting of the rubber by the vinylaromatic monomer present in the polymerization mixture.

The grafting of the rubber may be increased by:

using an initiator with a higher grafting power, increasing the polymerization temperature, increasing the amount of initiator.

The grafting power of the initiator may be determined by routine comparative tests by analysing the morphology induced by the nature of the initiator. The grafting power of the initiator is higher the more it tends to generate the following morphologies, given in the direction of increasing grafting power: salami, then onion or labyrinth, then capsule. Very large amounts of initiator, for example so that the ratio of the product $(INIT) \times F_{INIT}$ to the molar amount of vinylaromatic monomer is greater than $2 \times 10^{-4}$, or even greater than $4 \times 10^{-4}$ or even greater than $6 \times 10^{-4}$, may be introduced. Such amounts are not usual in vinylaromatic monomer polymerization processes since they cause substantial heat generation, the heat being difficult to remove and possibly dangerous. In the context of the present invention, the Applicant has found that, on account of the amounts of initiator used, less heat was generated than normally observed. This phenomenon allows the use of large amounts of initiator, thereby allowing the grafting and the particle morphology to be controlled as desired.

DETAILED DESCRIPTION

Figure 1:
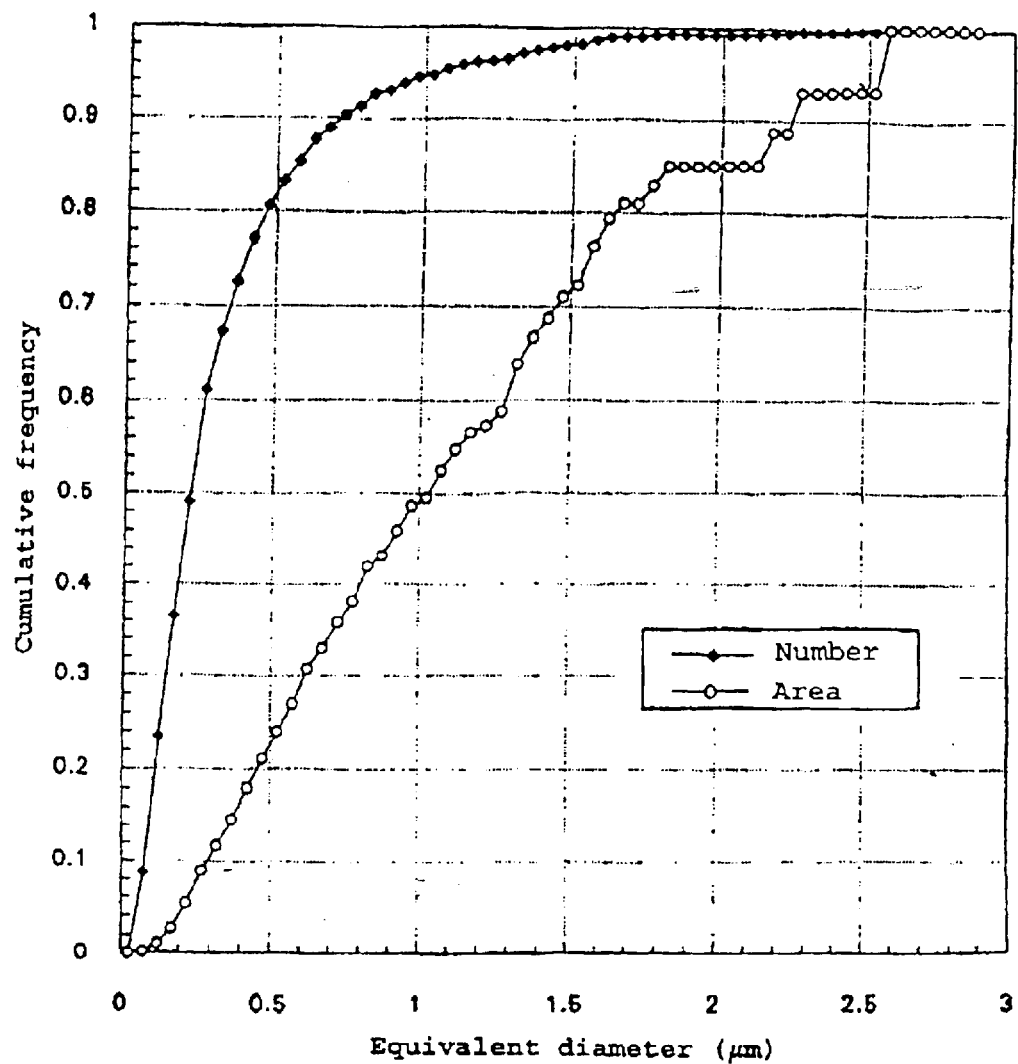
FIG. 1 is a graph of number-based and 2D area-based histograms, as described in Example 1 of the present specification.

The process according to the invention makes it possible to obtain particularly impact-resistant and/or particularly glossy compositions with a high polymerization rate.

The process according to the invention results in compositions having a high fluidity and a high Vicat softening point, combined with, if required, a high impact resistance.

If it is desired to produce a composition whose essential property is impact resistance (hereafter called "impact" composition), it is recommended to find conditions such that the rubber nodules have partially both a salami and/or labyrinth morphology and partially both an onion and/or capsule morphology. In addition, it is recommended to find conditions such that the nodule size distribution is broad and even bimodal. In the context of the present invention, when a composition at least partially comprises salami- and/or labyrinth-type nodules and when the grafting conditions are increased, an increase in the amount of capsule-type nodules is observed and the gloss of the composition is increased thereby. Moreover, for this type of "impact" composition, comprising salami- and/or labyrinth-type nodules, the nodule size distribution is broader than for compositions coming from the same process but in which no stable free radical had been introduced. Such a composition has a high impact resistance. For this type of "impact" composition, the process according to the invention allows good utilization of the rubber, that is to say it leads to compositions having a high impact resistance for a relatively small amount of rubber.

Such an "impact" composition is preferably such that, in one of its sections, 20 to 60% of the total area occupied by the particles corresponds to particles having an equivalent diameter ranging from 0.1 to 1 µm, 5 to 20% of the total area occupied by the particles corresponds to particles having an equivalent diameter ranging from 1 to 1.6 µm and 20 to 75% of the total area occupied by the particles corresponds to particles having an equivalent diameter of greater than 1.6 µm.

When the grafting of the particles is relatively low, the morphology of the particles, as a function of the size range of the equivalent diameters, is as follows:

0.1 to 1 µm: more than 95% of the particles have the salami or capsule morphology, 1 to 1.6 µm: more than 95% of the particles have the salami morphology, and greater than 1.6 µm: more than 95% of the particles have the salami morphology.

When the grafting of the particles is higher, the morphology of the particles, as a function of the size ranges, is as follows:

0.1 to 1 µm: more than 95% of the particles have the capsule or onion or labyrinth morphology, 1 to 1.6 µm: more than 95% of the particles have the onion or labyrinth morphology, and greater than 1.6 µm: more than 95% of the particles have the labyrinth morphology.

The "impact" compositions may especially be used for producing injection-moulded articles in the audio-video field (cases for television sets or video recorders) or in the office field (cases for computers, printers or fax machines). In order to produce these articles, it is necessary to be able to have available compositions having a high fluidity (in order to facilitate injection moulding) together with a high impact resistance and a high Vicat softening temperature (in order to improve the hot strength, i.e. to limit heat-induced deformation). The invention makes it possible to obtain compositions having these combinations of properties.

The process according to the invention may also result in a composition in which the rubber nodules are essentially in capsule form. Such a composition (hereafter called "glossy" composition) has a high gloss and is, in general, essentially monomodal. Such a composition may be obtained by causing a high level of grafting during the polymerization and by using a rubber of sufficiently low viscosity. It is also important to take care that the stirring during the polymerization exerts sufficient shear for the capsule morphology to be obtained. Such a "glossy" composition is such that, in one of its cuts, at least 90% of the total area occupied by the particles corresponds to capsules having an equivalent diameter ranging from 0.1 to 1 µm.

The "glossy" compositions also have good transparency, this being manifested by low haze values. Very low haze values may be obtained despite the use of a homopolybutadiene, whereas in the prior art it is general to use, as rubber, a styrene-butadiene copolymer in order to lower the haze. If required, so as to increase the transparency further, it is possible to blend these "glossy" compositions with crystal polystyrene. These glossy compositions, which may or may not be alloyed with crystal polystyrene, are used in particular in the packaging field for the manufacture, by thermoforming, of pots, goblets and trays, the average wall thickness of which is generally between 25 and 50 microns and more particularly between 50 and 250 microns.

In all cases, especially in that of the "impact" and "glossy" compositions, the final composition comprises a matrix of a vinylaromatic polymer surrounding particles of a rubber, the said composition also comprising a stable free radical and/or a stable-free-radical-generating group forming part of a polymer chain. In fact, the stable free radical may essentially be in a free form and/or in a form bound to a polymer chain by a covalent bond. In general, the tendency of a stable-free-radical-generating group to release its stable free radical increases with temperature. The final composition therefore has a higher or lower content of stable free radicals or stable-free-radical-generating groups depending on the intensity of the devolatilization treatment carried out on the said composition and also depending on the nature of the stable free radical or of the stable-free-radical-generating group. The devolatilization treatment is more intense the longer its duration and/or the higher its temperature and/or the higher its vacuum.

Because of the presence of a stable free radical and/or a stable-free-radical-generating group, the final composition has an improved resistance to hot depolymerization and to ultraviolet.

In addition, because of the possibility of using large amounts of polymerization initiator, especially of the peroxide family, the-grafting of-the rubber by the vinylaromatic monomer is improved, this having the effect, for a given temperature, of reducing the shrinkage of the material. This improvement produces a reduction in the burning rate of the material, something which is an appreciable advantage, especially in the audio-video field or the office field.

The rubber may, for example, have a viscosity as a 5% by weight solution in styrene, measured at 25° C., ranging from 15 to 300 mPa.s.

The rubber, especially in the case of a polybutadiene, generally has a weight-average molecular mass ($M_w$), expressed in g/mol, ranging from 110,000 to 350,000, and preferably from 150,000 to 300,000, and generally has a number-average molecular mass ($M_n$), expressed in g/mol, ranging from 50,000 to 250,000 and preferably from 70,000 to 200,000.

By way of example, for the case in which it is desired to produce an "impact" composition, i.e. one comprising partially both nodules with the salami and/or labyrinth morphology and partially both nodules with the onion and/or capsule morphology, it is possible to use a homopolybutadiene having a viscosity as a 5% by weight solution in styrene, measured at 25° C., ranging from 60 to 300 mPa.s. In the case of such an "impact" composition, the rubber, especially in the case of a polybutadiene, preferably has a weight-average molecular mass ranging from 175,000 to 350,000 and even more preferably from 200,000 to 300,000, and preferably has a number-average molecular mass ranging from 70,000 to 250,000 and even more preferably from 90,000 to 200,000.

By way of example, in the case in which it is desired to produce a "glossy" composition, i.e. one in which most of the nodules are in capsule form, it is possible to use a homopolybutadiene having a viscosity ranging from 15 to 60 mPa.s, measured at 25° C., as a 5% by weight solution in styrene. In the case of such a "glossy" composition, the rubber, especially in the case of a polybutadiene, preferably has a weight-average molecular mass ranging from 110,000 to 200,000 and preferably ranging from 150,000 to 200,000, and preferably has a number-average molecular mass ranging from 50,000 to 200,000 and even more preferably from 70,000 to 150,000.

A stable free radical should not be confused with free radicals whose lifetime is ephemeral (a few milliseconds), such as the free radicals produced by the usual polymerization initiators such as peroxides, hydroperoxides and azo-type initiators. Polymerization-initiating free radicals tend to accelerate the polymerization. By contrast, stable free radicals generally tend to slow down the polymerization. In general, it may be stated that a free radical is stable in the sense of the present invention if it is not a polymerization initiator and if, under the conditions of use of the present invention, the average lifetime of the radical is at least five minutes. Over this average lifetime, the molecules of the stable free radical continually alternate between the state of a radical and the state of a group bound to a polymer chain by a covalent bond. Of course, it is preferable for the stable free radical to exhibit good stability throughout the duration of its use in the context of the present invention. Generally speaking, a stable free radical may be isolated in the radical state at room temperature. A stable free radical is stable enough for its free radical state to be characterized using spectroscopic methods.

It will be recalled that the notion of a stable free radical is known by those skilled in the art for denoting a radical that is so persistent and unreactive with respect to air and to moisture in the ambient air that the pure radical may be handled and stored without any more precautions at room temperature than those for most commercial chemicals (see, on the subject D. Griller and K. Ingold, Accounts of Chemical Research, 1976, 9, 13–19 or A. Forrester et al., Organic Chemistry of Stable Free Radicals, Academic Press, 1968).

The family of stable free radicals includes in particular the compounds acting as radical polymerization inhibitors for storing monomers, stable nitroxyl radicals, i.e. those comprising the =N—O⁺ group. It is possible to use, as stable free radical, the radicals represented, for example, by the following formulae:

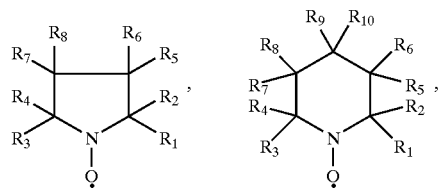

in which n represents a non-zero integer and R1, R2, R3, R4, R'1 and R'2, which may be identical or different, represent a halogen atom, such as a chlorine, bromine or iodine atom, a saturated or unsaturated, linear, branched or cyclic hydrocarbon, group, such as an alkyl or phenyl radical, or an ester group —COOR or an alkoxyl group —OR, or a phosphonate group —PO(OR)$_2$, or a polymer chain which may, for example, be a polymethyl methacrylate, polybutadiene or polyolefin, such as polyethylene or polypropylene, chain but which is preferably a polystyrene chain, and in which R5, R6, R7, R8, R9 and R10, which may be identical or different, may be chosen from the same family of groups as that which was envisaged for R1, R2, R3, R4, R'1 and R'2 and may also represent a hydrogen atom, a hydroxide group —OH, an acid group such as —COOH or —PO(OH)$_2$ or —SO$_3$H.

In particular, the stable free radical may be 2,2,5,5-tetramethyl-1-pyrrolidinyloxy sold under the name PROXYL, 2,2,6,6-tetramethyl-1-piperidinyloxy, generally sold under the name TEMPO, 4-hydroxy-2,2,6,6-tetramethyl-1-piperidinyloxy sold under the name 4-hydroxy TEMPO, or bis(1-oxyl-2,2,6,6-tetramethylpiperidin-4-yl)sebacate sold under the brand CXA 5415 by the company Ciba Specialty Chemical.

The stable free radical may also be chosen from the following list:
  N-tert-butyl-1-phenyl-2-methylpropyl nitroxide,
  N-tert-butyl-1-(2-naphthyl)-2-methylpropyl nitroxide,
  N-tert-butyl-1-diethylphosphono-2,2-dimethylpropyl nitroxide,
  N-tert-butyl-1-dibenzylphosphono-2,2-dimethylpropyl nitroxide,
  N-phenyl-1-diethylphosphono-2,2-dimethyl-propyl nitroxide,
  N-phenyl-1-diethylphosphono-1-methylethyl nitroxide,
  N-(1-phenyl-2-methylpropyl)-1-diethylphosphono-1-methylethyl nitroxide
  4-oxo-2,2,6,6-tetramethyl-1-piperidinyloxy,
  2,4,6-tri-tert-butylphenoxy.

In the context of the present application, the stable free radical is not introduced into the polymerization mixture in a form bound to the rubber, as would be the case with a rubber carrying a stable-free-radical-generating group.

The initiator is a radical polymerization initiator which may be chosen from diacyl peroxides, peroxyesters, dialkyl peroxides and peroxyacetals. Particularly suitable initiators are the following:
  isopropyl tert-butyl peroxycarbonate,
  2-ethylhexyl tert-butyl peroxycarbonate,
  dicumyl peroxide
  di-tert-butyl peroxide,
  1,1-bis(tert-butylperoxy)cyclohexane,
  1,1-bis(tert-butylperoxy)-3,3,5-triiethylcyclohexane,
  tert-butyl peroxyacetate,
  cumyl tert-butyl peroxide,
  tert-butyl perbenzoate,
  tert-butyl per-2-ethylhexanoate,
  2,2-bis(tert-butylperoxy)butane,
  butyl 4,4-bis(tert-butyl)valerate,
  ethyl 3,3-bis(tert-butyl)butyrate,
  2,2-bis(4,4-di-tert-butylperoxycyclo-hexyl)propane.

The initiators which generate at least one tert-butyloxy radical, i.e. $(CH_3)_3—C—O^+$, are more particularly suitable.

It is preferable to choose a radical-generating initiator having the least possible tendency to form an adduct with the stable free radical, the said radicals furthermore having the highest possible potential of grafting onto the rubber by pulling off hydrogen atoms from the said rubber.

The term "vinylaromatic monomer" in the context of the present invention should be understood to mean an ethylenically unsaturated aromatic monomer such as styrene, vinyltoluene, alphamethyl styrene, alphaethyl styrene, 4-methyl styrene, 3-methyl styrene, 4-methoxy styrene, 2-hydroxymethyl styrene, 4-ethyl styrene, 4-ethoxy styrene, 3,4-dimethyl styrene, 2-chloro styrene, 3-chloro styrene, 4-chloro-3-methyl styrene, 3-tert-butyl styrene, 2,4-dichloro styrene, 2,6-dichloro styrene, 1-vinylnaphthalene and vinylanthracene.

Styrene is a preferred vinylaromatic monomer.

The rubber is an elastomer normally used for imparting impact properties to vinylaromatic polymers. The rubber may be a conjugated polydiene, such as polybutadiene, polyisoprene and styrene-butadiene copolymers of the elastomer type, also called SBR (styrene-butadiene rubber). The rubber may comprise less than 10% and preferably less than 5% by weight of a polymerized vinylaromatic monomer unit. The rubber may not comprise a vinylaromatic monomer as a polymerization unit, as is the case for styrene-butadiene block copolymers. The rubber may therefore be a homopolybutadiene. The polymerization mixture during the step of the process according to the invention may initially comprise:
  per 100 parts by weight of vinylaromatic monomer,
  2 to 35 parts by weight of rubber and
  0 to 50 parts by weight of solvent.

The solvent may be organic and chosen so that it does not boil under the polymerization conditions and in such a way that it is miscible with the vinylaromatic monomer and with the vinylaromatic polymer derived therefrom. It is possible to use alicyclic hydrocarbons such as cyclohexane, or preferably aromatics, such as toluene,-benzene, ethylbenzene or xylene.

The polymerization mixture may also contain at least one monomer copolymerizable with the vinylaromatic monomer or monomers, such as, for example at least one acrylic or methacrylic monomer or acrylonitrile. The term "polymerization" therefore covers those of homopolymerization, copolymerization and interpolymerization and the term "polymer" covers those of homopolymer, copolymer and interpolymer.

After the so-called phase-inversion phenomenon, i.e. the formation of particles, it is possible to add a polymerization initiator identical to or different from that present at the start of polymerization, so as to increase the polymerization rate. The amounts of initiator added after phase inversion are not to be taken into account in the calculation of the $[F_{SFR} \times (SFR)]/[F_{INIT} \times (INIT)]$ ratio with which the present application is concerned.

Preferably, the weight-average molecular mass ($M_w$) of the vinylaromatic polymer matrix ranges from 90,000 to 250,000 and preferably from 100,000 to 200,000. Generally, the polydispersivity $M_w/M_n$ of the matrix ranges from 2.2 to 3.5 and more particularly from 2.3 to 3.

In the case of an "impact" composition, the weight-average molecular mass of the matrix generally ranges from 90,000, to 200,000 and preferably from 100,000 to 150,000, for example from 110,000 to 130,000.

In the case of a "glossy" composition, the weight-average molecular mass of the matrix generally ranges from 130,000 to 250,000, for example from 150,000 to 200,000.

It is possible to add to the polymerization mixture, before or during the polymerization, at least one additive normally used in this kind of preparation. These additives may be plasticizers, such as mineral oils, butyl stearate or dioctyl phthalate, or stabilizers, such as antioxidants, which may be phenol substituted with an alkyl group, such as di-tert-butylparacresol, or phosphites such as trinonylphenyl phosphite.

If a plasticizer is introduced, this may be so in an amount such that it is present in the finally synthesized composition in an amount of 0 to 6% by weight.

If a stabilizer is introduced, this may be present in the polymerization mixture in an amount of 0 to 3000 ppm.

During the polymerization, the well-known phenomenon of phase inversion occurs, which leads to the formation of rubber nodules dispersed in a vinylaromatic polymer matrix. During this polymerization, the stirring must be vigorous enough for the dispersion of the rubber nodules to be uniform.

The polymerization may be carried out in batch mode. The polymerization may also be carried out continuously and, in this case, preferably so that the phase inversion takes place in a plug-flow reactor. If the polymerization is carried out continuously so that the phase inversion takes place in a continuously stirred tank reactor or CSTR, then preferably the polymerization was already started in at least one other reactor before entry into the said phase-inversion continuously stirred tank reactor.

After polymerization, it is expedient to eliminate the volatile species such as the monomers that have not reacted, and any organic solvent. This may be carried out using conventional techniques, such as by the use of a devolatilizer operating hot and under vacuum.

The final rubber and vinylaromatic polymer content of the composition according to the invention depends on the degree of conversion to which the polymerization has been taken before elimination of the volatile species. This is because if the degree of polymerization conversion is low, elimination of the volatile species will remove a large amount of vinylaromatic monomer and the final rubber content of the composition will be higher.

The polymerization conversion may be monitored using samples taken during the polymerization step and by determining the solids content on the samples taken. The term "solids content" should be understood to mean the percentage by weight of solids obtained after evaporation under a vacuum of 25 millibar for approximately 20 minutes at 200° C. of the specimens taken with respect to the initial weight of the specimen taken. It may be possible to drive the polymerization, for example, until a solids content of between 60 and 80% by weight is obtained.

It is preferable to adjust the amounts of ingredients introduced and the manufacturing conditions so that the final composition contains between 2 and 25% and even more preferably between 4 and 15% of rubber.

Preferably, a step of the process according to the invention is at least partially carried out at a temperature ranging from 80 to 140° C., for example between 90 and 130° C.

Preferably, the step of the process according to the invention is carried out at least partially before phase inversion at a temperature T such that $T_{1/2}-20°$ C.$<T>T_{1/2}+20°$ C. and preferably such that $T_{1/2}-10°$ C.$<T>T_{1/2}+10°$ C., in which $T_{1/2}$ represents the temperature at which 50% of the initiator has decomposed in one hour. Most of the polymerization may be carried out in the temperature ranges just given.

The polymerization initiator may, for example, be present so that the molar ratio of $(INIT) \times F_{INIT}$ to the amount of vinylaromatic monomer goes from $1 \times 10^{-5}$ to $1 \times 10^{-2}$.

Preferably, the stable free radical is present so that $$0.1 < \frac{(SFR) \times F_{SFR}}{(RU)} < 10$$

in which (RU) represents the number of moles of rubber.

The polymerization process according to the invention makes it possible to obtain "impact" compositions having both a high fluidity (high $MI_5$), a high impact resistance and a high Vicat softening point. It is generally very difficult to obtain high values for these three properties at the same time.

In order to increase the fluidity, the molecular mass of the vinylaromatic polymer should be decreased, which may be achieved by increasing the polymerization temperature and by decreasing the polymerization time, and/or by increasing the concentration of chain-transfer agent (for example a mercaptan, such as n-dodecyl mercaptan or tert-dodecyl mercaptan) in the polymerization mixture, preferably after phase inversion. In the context of the process according to the invention, it is possible, using the means just mentioned, to obtain an "impact" composition having a melt index MI5 (210° C./5 kg) of greater than 15, while still maintaining a Vicat softening temperature (1 kg) of greater than 94, or even greater than 94.5, and a notched Izod impact strength of greater than 8, or even greater than 9.

In the examples which follow, the following technical terms have been used:

melt index $MI_5$ (at 210° C./5 kg): ISO 1133 H standard,
notched Izod impact strength: ISO 180/1A standard,
Vicat softening temperature (1 kg): ISO 306A50 standard,
gloss: this is measured on samples 60 mm in diameter, by determining the reflected light when the specimen is exposed to a light beam at an angle of 60°, according to the ASTM D523 standard. The measurement apparatus used is a Byk Gardner Micro-Tri-Gloss GLØ1 machine, haze: this is measured on a film approximately 300 microns in thickness, obtained by hot compression of an injection-moulded sample 60 mm in diameter and 2 mm in thickness. It is measured using a Byk Gardner spectrocolorimeter, according to the ASTM D 1003 standard, morphology: scanning electron microscopy on sections treated with osmium tetraoxide.

Table 2 gives the morphologies obtained for the examples in three equivalent-diameter size ranges (0.1 to 1 μm; 1 to 1.6 μm; greater than 1.6 μm). In each size range, if only one morphology is indicated this means that, in a section of the material, mores than 90% of the area occupied by the particles corresponding to this range have the morphology indicated. In each size range, if several morphologies are indicated, one of them is underlined, which means that, in a section of the material, more than 90% of the area occupied by the particles corresponding to this range have the morphology underlined.

The particle size distribution was determined in the manner described below.

From 15 to 20 images were taken for each product analysed. These images were taken randomly from thin sections. The magnification is chosen depending on the size of the coarsest objects, which must in no case exceed ⅙ of the total area of the field.

The magnification is chosen so that the following two criteria are met:

1. the coarsest of the particles does not occupy more than ⅙ of the area of the image, and
2. each particle occupies an area of at least 5 pixels.

In the case of some specimens, these two criteria cannot be combined for a single magnification. In this case, two series of different magnifications are used.

The electron microscopy images are digitized (in order to obtain a digital representation of 512×512 pixels each coding 256 grey levels) and then put into binary form so that the image now comprises only points having the value 1 or the value 0, using two operations—firstly a morphology gradient operation, followed by a size-2 top hat transformation (see, on the subject Jean SERRA, "Image Analysis and Mathematical Morphology, Vol. 1, Academic Press 1982).

The binary image is then manually restored (closure of contours, disconnection of objects and elimination of artefacts) so as to remove artefacts such as traces due to the cutting operation, cracks in the material or juxtapositions of nodules.

When two magnifications are necessary, the series of images taken with the lowest magnification undergoes an extraction operation, namely the coarsest nodules are selected and extracted so as to appear by themselves in the final image. These images serve as the basis for measuring their size. The space left by omitting the nodules not selected will subsequently be filled virtually, using the particle size measurement determined by analysing the series taken with the higher magnification (see the data reconciliation procedure below).

The binary images are then analysed using a measurement module. In general, from 15 to 20 images of the same specimen are used in order to obtain representative statistics. The percentage area occupied by the sections of nodules (objects) in the matrix (background) is estimated simply by counting the number of pixels having the value 1 in the images and by adding this number to the total number of pixels in the images. The area of each of the individual objects in the image is measured and this area allows the equivalent diameter to be calculated. The concept of equivalent diameter makes it possible to get round the problem of the shape of the object: $D_{eq}$ is the diameter of a disc which would have the same area as the object measured. Only complete objects are taken into account (partially visible nodules are eliminated, i.e. cut off by the edges of the image).

After a statistical edge-effect correction, called a Miles-Lantuejouls correction (see, on this subject: Michel Coster & Jean-Louis Chermant, "Précis d'Analyse d'Images [*Précis of Image Analysis*]", Presses du CNRS, 1989), a frequency histogram $n_i$=f (equivalent diameter $D_{eq,i}$) is formed.

The mean parameters characteristic of the population may be evaluated from a number-based cumulative representation:

$$Fk = \frac{\sum_{i=1}^{i=k} n_i}{N_T} = f(D_{eq})$$

where $$N_T = \sum_{i=1}^{i=imax} n_i$$

Fk being the frequency of the nodules having a size of less than or equal to $D_{eq,k}$, $N_T$ being the total number of nodules, $n_i$ being the number of nodules in the size class defined by $D_{eq,i}$, i being the index allowing the class sizes to be distinguished, and imax being the total number of classes in the histogram (number of different values of $D_{eq}$).

An area-based cumulative representation $$FS_k = \frac{\sum_{i=1}^{i=k} S_i}{S_T} = f(D_{eq})$$

where $$S_i = n_i \frac{\pi \cdot (D_{eq})^2}{4} \text{ and } S_T = \sum_{i=1}^{i=imax} S_i$$

$FS_k$ being the surface frequency of the nodules having a size of less than or equal to $D_{eq,k}$, $S_T$ being the total area occupied by the nodules taken into account (not those cut off by the edges of the image), $n_i$ being the number of nodules in the size class defined by $D_{eq,i}$ and $S_i$ being the area occupied by the nodules belonging to the size class defined by $D_{eq,i}$, is very suitable for showing bimodality in the population. In fact, the distribution of particle sizes may be regarded as being bimodal if this cumulative representation has a point of inflection.

When two magnifications have to be used to characterize the distributed nodule populations, a procedure for combining the two sets of data coming from the separate analysis of each magnification [list of equivalent diameters] is employed (data reconciliation). This combining procedure uses the ratio of the areas scanned in the sections in order to normalize the two populations: by taking as base the scanned area for determining the particle sizes of the coarse nodules (cumulative total of the field areas scanned at low magnification), the particle size of the small nodules [low magnification] is used to construct a homogeneous population. The proportionality coefficient between the two populations is given by the following ratio:

$$Q = \frac{S_1 - S_{nodules}}{S_0}$$

where $S_0$ and $S_1$ are the scanned areas in the section under high magnification and under low magnification, respectively, and $S_{nodules}$ is the area occupied by the sections of nodules in the series of images taken at low magnification. This ratio Q is used to multiply the number of occurrence of equivalent diameters determined by analysing the series of images taken at high magnification.

The histograms thus normalized are combined by choosing a cut-off threshold between the two sets of data. This threshold is chosen in an interactive manner in the region of overlap of the histograms.

The same calculations as previously are carried out on the resulting population, after it has been normalized.

EXAMPLE 1 (COMPARATIVE EXAMPLE)

The following materials are introduced, at room temperature, into a 16 litre stainless steel reactor fitted with a stirring system and with a temperature controller: 9470 g of styrene, 660 g of ethylbenzene, 220 g of a plasticizing mineral oil of the brand PRIMOL 352 sold by the company Esso, 11 g of an antioxidant of the brand IRGANOX 1076 sold by the company Ciba and 640 g of a homopolybutadiene of the brand BUNA CB HX 527 SIC sold by the company Bayer, this rubber having a weight-average molar mass of 245,000 g/mol, a polydispersivity index of 2.35, a 100° C. (1+4) ML Mooney viscosity of 46 and a viscosity as a 5% by weight solution in styrene at 25° C. of 145 mPa.s. The mixture is stirred at 80 revolutions per minute. After completely dissolving the polybutadiene, 2.9 g of isopropyl tert-butyl peroxycarbonate (i.e. $1.235 \times 10^{-2}$ mol) diluted to 75% by weight in a hydrocarbon, sold under the brand LUPEROX TBIC-M75 by the company Luperox, are introduced. The solution is heated to 130° C. in 30 minutes. This temperature is maintained for 1 h 30 min. and then heated to 145° C. The polymerization conversion is monitored by taking regular samples during the polymerization step and by determining the solids content on the said samples.

The term "solids content" should be understood to mean the percentage by weight of solids, obtained after evaporation under a vacuum of 25 millibar for approximately 20 minutes at 200° C., of the samples taken with respect to the initial weight of the sample taken. After phase inversion, the stirring is reduced from 80 to 40 revolutions per minute. After a solids content of approximately 60% has been obtained, the contents of the reactor are transferred into a superheater at 230° C. so as to crosslink the elastomer (residence time: approximately 10 minutes) and then into a devolatilizer at 230° C. under a vacuum of about 50 mbar so as to remove the ethylbenzene and the residual styrene. The properties of the composition thus obtained are given in Tables 1 and 2. FIG. 1 is a number-based and area-based cumulative representation of the amounts of particles as a function of their equivalent diameter.

EXAMPLE 2

The procedure is carried out as in Example 1, except that 1.6 g (i.e. $0.93 \times 10^{-2}$ mol) of the stable free radical 4-hydroxy-2,2,6,6-tetramethyl piperidinyloxy (which may be called OH-TEMPO) are added just before the heating step and except that the polymerization temperature is set at 120° C.

Figure 2:
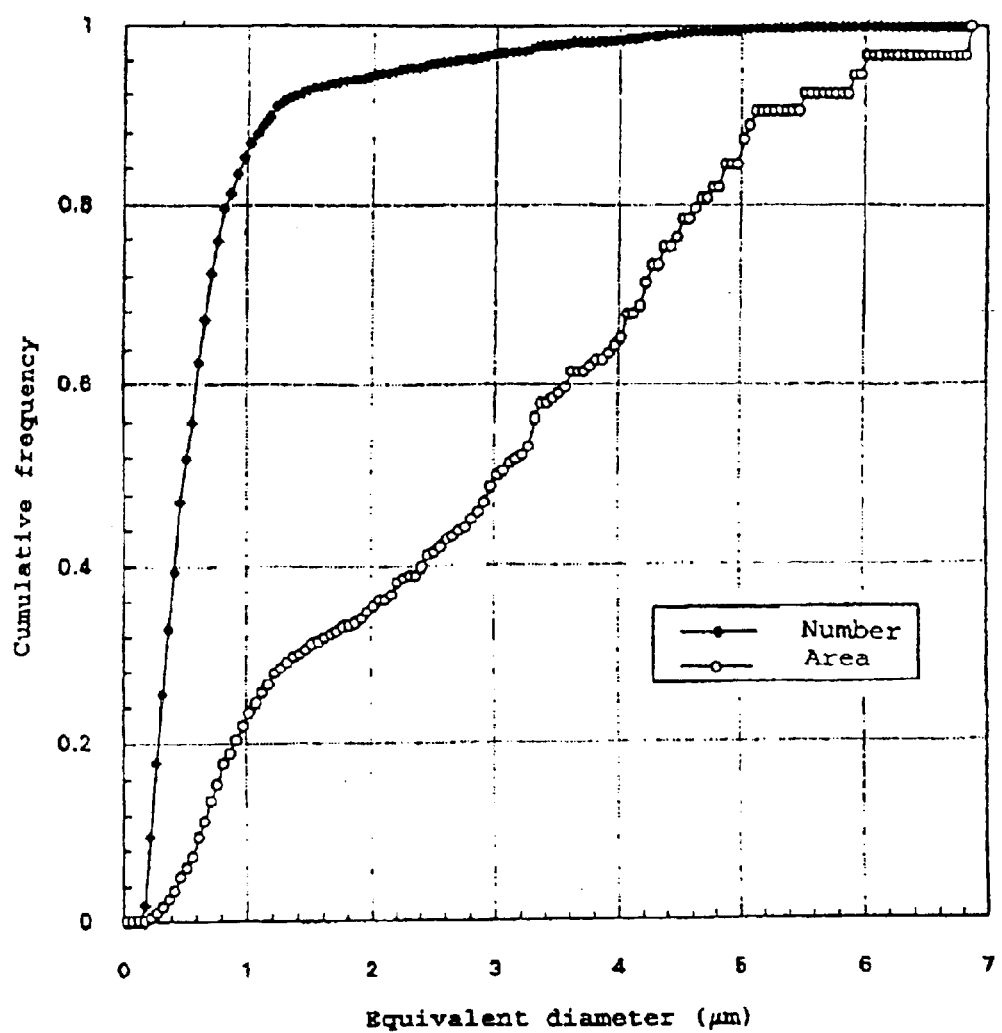
FIG. 2 is a graph of number-based and 2D area-based histograms, as described in Example 2 of the present specification.

The properties of the composition thus obtained are indicated in Tables 1 and 2. FIG. 2 is a number-based and area-based cumulative representation of the amounts of particles as a function of their equivalent diameter.

EXAMPLE 3

Figure 3:
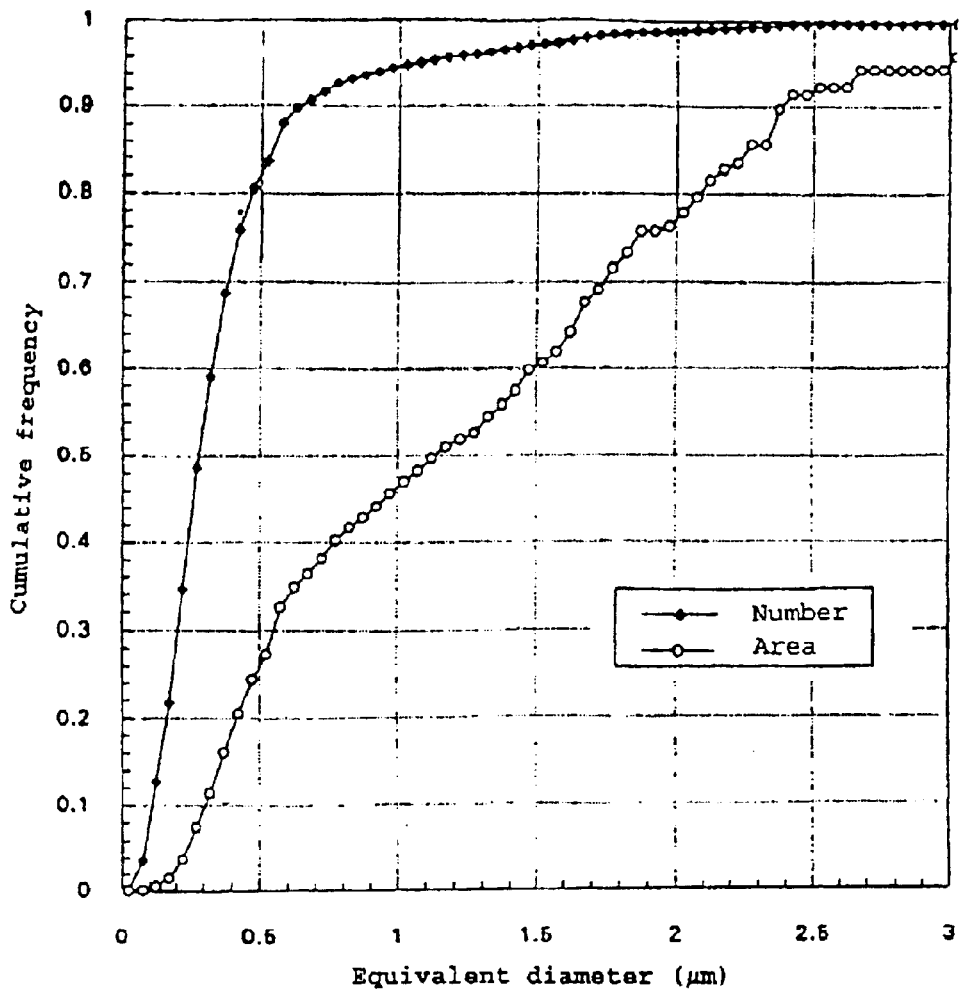
FIG. 3 is a graph of number-based and 2D area-based histograms, as described in Example 3 of the Present specification.

The procedure is carried out as in Example 2, except that just before the heating step 4.9 g of LUPEROX TBIC-M75 (i.e. $2.085 \times 10^{-2}$ mol) are added instead of the 2.9 g. The properties of the composition thus obtained are given in Tables 1 and 2. FIG. 3 is a number-based and area-based cumulative representation of the amounts of particles as a function of their equivalent diameter.

EXAMPLE 4

Figure 4:
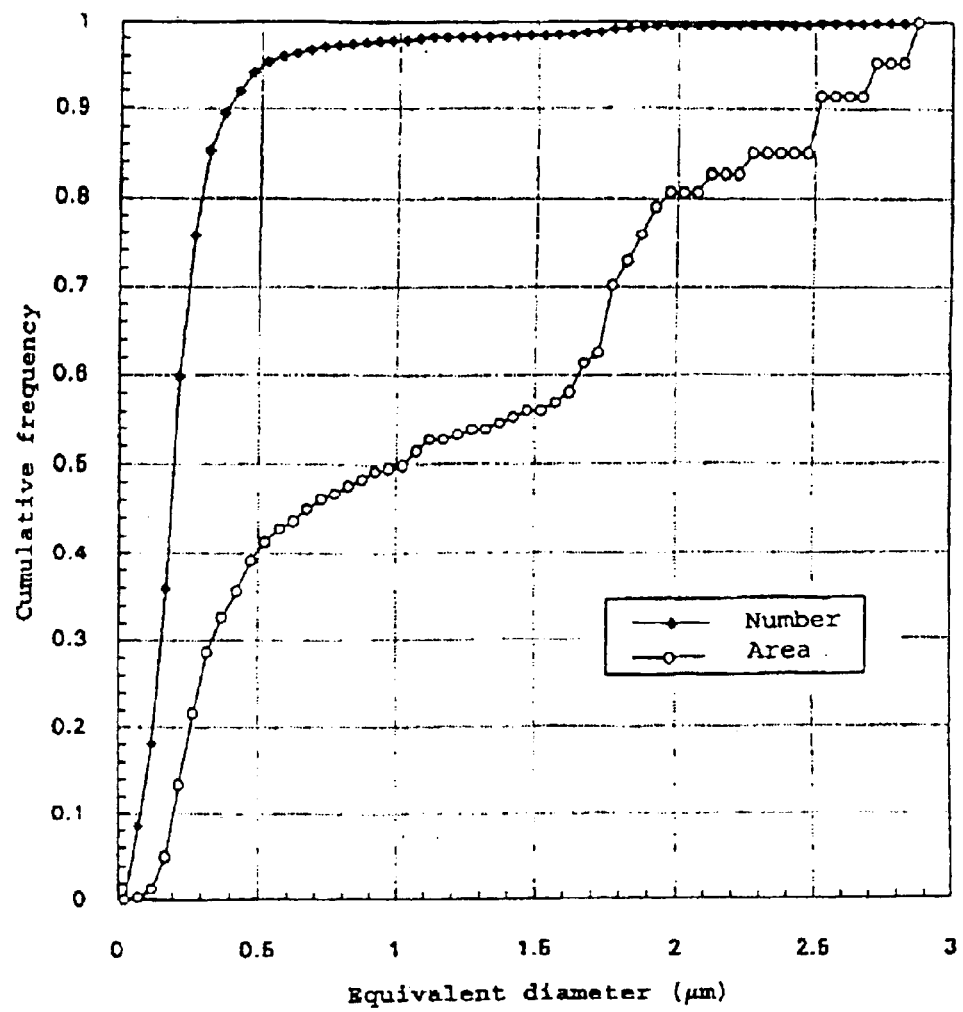
FIG. 4 is a graph of number-based and 2D area-based histograms, as described in Example 4 of the present invention.

The procedure is carried out as in Example 1 except that, before the heating step, 8.75 g of LUPEROX TBIC-M75 (i.e. $3.705 \times 10^{-2}$ mol), instead of the 2.9 g, and 4.25 g (i.e. $2.47 \times 10^{-2}$ mol) of OH-TEMPO are added. In addition, the polymerization temperature is set at 120° C. The properties of the compositions thus obtained are given in Tables 1 and 2. FIG. 4 is a number-based and area-based cumulative representation of the amounts of particles as a function of their equivalent diameter.

EXAMPLE 5

The procedure is carried out as in Example 1, but by setting the polymerization temperature at 120° C. and starting by initially dissolving the following ingredients in the following amounts:

styrene: 9540 g, mineral oil, PRIMOL 352: 220 g, antioxidant, IRGANOX 1076: 11 g, polybutadiene of the brand BUNA CB HX 565 having a weight-average molecular mass of 172,500, a polydispersivity of 1.6, a 100° C. (1+4) ML Mooney viscosity of 56 and a viscosity as a 5% by weight solution in styrene, at 25° C., of 44 mPa·s: 570 g, ethylbenzene: 660 g.

Just before the heating step, the following are added to the dissolution:

LUPEROX TBIC-M75: 8.1 g, i.e. $3.45 \times 10^{-2}$ mol,

OH-TEMPO: 2.6 g, i.e. $1.51 \times 10^{-2}$ mol.

Figure 5:
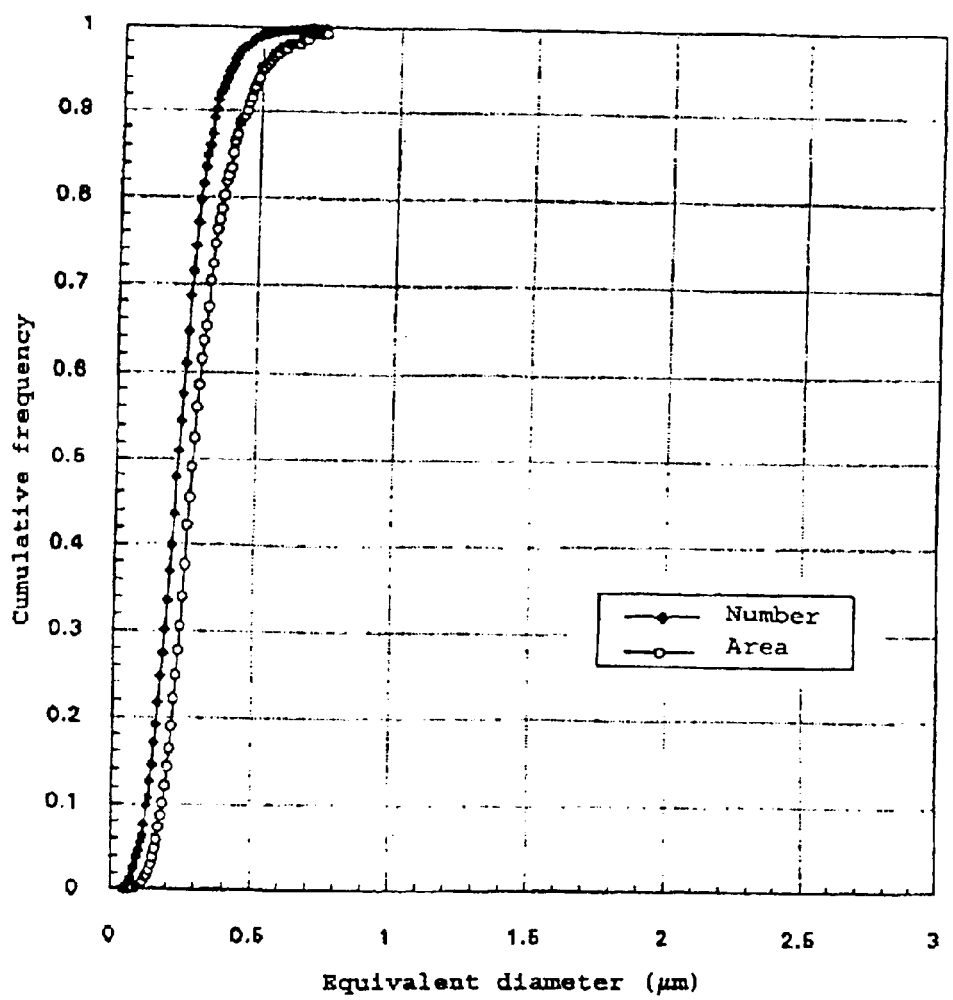
FIG. 5 is a graph of number-based and 2D area-based histograms, as described in Example 5 of the present invention.

The properties of the composition thus obtained are given in Tables 1 and 2. FIG. 5 is a number-based and area-based cumulative representation of the amounts of particles as a function of their equivalent diameter.

TABLE 1

| | UNITS | 1 (comparative) | 2 | 3 | 4 | 5 |
|---|---|---|---|---|---|---|
| Amount of initiator (INIT) | mol | $1.235 \times 10^{-2}$ | $1.235 \times 10^{-2}$ | $2.085 \times 10^{-2}$ | $3.705 \times 10^{-2}$ | $3.45 \times 10^{-2}$ |
| Amount of stable free radical (SFR) | mol | 0 | $0.93 \times 10^{-2}$ | $0.93 \times 10^{-2}$ | $2.47 \times 10^{-2}$ | $1.51 \times 10^{-2}$ |
| $\dfrac{(SFR) \times F_{SFR}}{(INIT) \times F_{INIT}}$ | | 0 | 0.38 | 0.22 | 0.33 | 0.22 |
| Viscosity of the polybutadiene as 5% solution in styrene at 25° C. | mPa.s | 145 | 145 | 145 | 145 | 44 |
| Amount of polybutadiene (RU) | mol | $0.61 \times 10^{-2}$ | $0.61 \times 10^{-2}$ | $0.61 \times 10^{-2}$ | $0.61 \times 10^{-2}$ | $0.53 \times 10^{-2}$ |
| $\dfrac{(SFR) \times F_{SFR}}{(RU)}$ | | 0 | 1.5 | 1.5 | 4 | 2.9 |
| Amount of polybutadiene | % by weight | 8.5 | 8.5 | 8.5 | 8.6 | 8.4 |
| Melt index MI. | g/10 min. | 2.9 | 2.6 | 3.6 | 10.3 | 6.4 |
| Izod impact strength | kJ/m² | 11.6 | 14.1 | 15.4 | 13 | 5.3 |
| Vicat softening temperature (1 kg) | ° C. | 94.5 | 95.0 | 94.7 | 95 | 94.7 |
| Gloss | UB | 29 | 21 | 40 | 65 | 82 |
| Transparency (haze) | % | 80 | | | 75 | 30 |

TABLE 2

| | | 1 (comparative) | 2 | 3 | 4 | 5 |
|---|---|---|---|---|---|---|
| Nodule distribution | | monomodal | bimodal | bimodal | bimodal | monomodal |
| Particles having an equivalent diameter of between 0.1 and 1 μm | % by area | 49 | 22 | 47 | 50 | 100 |
| | morphology | capsule + salami | capsule + salami | capsule + onion + labyrinth | capsule + onion + labyrinth | capsule |
| Particles having an equivalent diameter of between 1 and 1.6 μm | % by area | 28 | 9 | 16 | 8 | — |
| | morphology | salami | salami | onion + labyrinth | onion + labyrinth | — |
| Particles having an equivalent diameter of greater than 1.6 μm | % by area | 23 | 69 | 37 | 42 | — |
| | morphology | salami | salami | labyrinth | labyrinth | — |

What is claimed is:

1. A process for preparing a composition of a vinylaromatic polymer matrix surrounding rubber nodules, comprising a step of polymerizing at least one vinylaromatic monomer in the presence of a rubber, a stable free radical which is not introduced into the polymerization mixture in a form linked to a rubber, and a polymerization initiator with a grafting character suitable for said composition wherein said polymerization involves at least one phase inversion, wherein said composition is such that in a cross-section of the polymer matrix surrounded rubber nodules at least 90% of the total area occupied by the nodules corresponds to capsules having a diameter ranging from 0.1 to 1.0 μm, or else wherein said composition is such that it comprises multi-occlusion nodules and is such that in one of its sections
20 to 60% of the total area occupied by the particles corresponds to particles having a diameter ranging from 0.1 to 1 μm,
5 to 20% of the total area occupied by the particles corresponds to particles having a diameter ranging from 1 to 1.6 μm, and
20 to 75% of the total area occupied by the particles corresponds to particles having a diameter of greater than 1.6 μm, said step being such that:

if (SFR) represents the number of moles of stable free radical in the polymerization mixture, if $F_{SFR}$ represents the functionality of the stable free radical, i.e. the number of sites on the same molecule of stable free radical having the stable free radical state, if (INIT) represents the number of moles of polymerization initiator in the polymerization mixture before phase inversion, and if $F_{INIT}$ represents the functionality of the initiator introduced before phase inversion, i.e. the number of sites having the free radical state that each molecule of initiator is capable of generating, then:

$$0.05 < \frac{F_{SFR} \times (SFR)}{F_{INIT} \times (INIT)} < 1.$$

2. Process according to claim 1, characterized in that $$0.05 < \frac{F_{SFR} \times (SFR)}{F_{INIT} \times (INIT)} < 0.05.$$

3. Process according to claim 1, characterized in that, if (RU) represents the number of moles of rubber, $$0.1 < \frac{(SFR) \times F_{SFR}}{(RU)} < 10.$$

4. Process according to claim 1, characterized in that the ratio of (INIT)×$F_{INIT}$ to the molar amount of vinylaromatic monomer ranges from $1 \times 10^{-5}$ to $1 \times 10^{-2}$.

5. Process according to claim 1, characterized in that the ratio of (INIT)×$F_{INIT}$ to the molar amount of vinylaromatic monomer is greater than $2 \times 10^{-4}$.

6. Process according to claim 1, characterized in that the ratio of (INIT)×$F_{INIT}$ to the molar amount of vinylaromatic monomer is greater than $4 \times 10^{-4}$.

7. Process according claim 1, characterized in that the ratio of (INIT)×$F_{INIT}$ to the molar amount of vinylaromatic monomer is greater than $6 \times 10^{-4}$.

8. Process according to claim 1, characterized in that the polymerization mixture during the step of the process comprises, per 100 parts by weight of vinylaromatic monomer, 2 to 35 parts by weight of rubber and 0 to 5 parts by weight of solvent.

9. Process according to claim 1, characterized in that the rubber has a weight-average molecular mass ranging from 110,000 to 350,000 and a number-average molecular mass ranging from 50,000 to 250,000, and in that the matrix of vinylaromatic polymer has a weight-average molecular mass ranging from 90,000 to 250,000.

10. Process according to claim 1, characterized in that the rubber nodules have partially both a salami and/or labyrinth morphology and partially both an onion and/or capsule morphology.

11. Process according to claim 1, characterized in that:
in the 0.1 to 1 μm size range, more than 95% of the particles have the salami or capsule morphology,
in the 1 to 1.6 μm size range, more than 95% of the particles have the onion or salami morphology, and
in the greater than 1.6 μm size range, more than 95% of the particles have the salami morphology.

12. Process according to claim 1, characterized in that:
in the 0.1 to 1 μm size range, more than 95% of the particles have the capsule or onion or labyrinth morphology,
in the 1 to 1.6 μm size range, more than 95% of the particles have the onion or labyrinth morphology, and
in the greater than 1.6 μm size range, more than 95% of the particles have the labyrinth morphology.

13. Process according to claim 1, characterized in that the distribution of the diameters of nodules is bimodal.

14. Process according to claim 10, characterized in that the rubber has, as a 5% by weight solution in styrene, a viscosity at 25° C. ranging from 60 to 300 mPa.s.

15. Process according to claim 10, characterized in that the rubber has a weight-average molecular mass ranging from 175,000 to 350,000 and a number-average molecular mass ranging from 70,000 to 250,000.

16. Process according to claim 15, characterized in that the rubber has a weight-average molecular mass ranging from 200,000 to 300,000 and a number-average molecular mass ranging from 90,000 to 200,000.

17. Process according to claim 1, characterized in that the composition is such that, in one of its cross-sections, at least 90% of the total area occupied by the particles corresponds to capsules having a diameter ranging from 0.1 to 1 μm.

18. Process according to claim 17, characterized in that the rubber has, as a 5% by weight solution in styrene, a viscosity at 25° C. ranging from 15 to 60 mPa.s.

19. Process according to claim 17 or 18, characterized in that the rubber has a weight-average molecular mass ranging from 110,000 to 200,000 and a number-average molecular mass ranging from 50,000 to 200,000.

20. Process according to claim 19, characterized in that the rubber has a weight-average molecular mass ranging from 150,000 to 200,000 and a number-average molecular mass ranging from 70,000 to 150,000.

21. Process according to claim 1, characterized in that the rubber is a homopolybutadiene.

22. Process according to claim 1, characterized in that the initiator is one of the following:
isopropyl tert-butyl peroxycarbonate,
2-ethylhexyl tert-butyl peroxycarbonate,
dicumyl peroxide
di-tert-butyl peroxide,
1,1-bis(tert-butylperoxy)cyclohexane,
1,1-bis(tert-butylperoxy)-3,3,5-trimethylcyclohexane,
tert-butyl peroxyacetate,
cumyl tert-butyl peroxide,
tert-butyl perbenzoate,
tert-butyl per-2-ethylhexanoate,
2,2-bis(tert-butylperoxy)butane,
butyl 4,4-bis(tert-butyl)valerate,
ethyl 3,3-bis(tert-butyl)butyrate,
2,2-bis(4,4-di-tert-butylperoxycyclohexyl)propane.

23. Process according to claim 1, characterized in that the initiator is chosen from diacyl peroxides, peroxy esters, dialkyl peroxides and peroxy acetals.

24. Process according to claim 23, characterized in that the initiator generates at least one tert-butyloxy radical.

25. Process according to claim 24, characterized in that the initiator is one of the following:
isopropyl tent-butyl peroxycarbonate,
1,1-bis(tert-butylperoxy)cyclohexane,
1-1-bis(tert-butylperoxy)-3,3,5-trimethyl-cyclohexane.

26. Process according to claim 1, characterized in that the polymerization step is carried out at least partially at 80 to 140° C.

27. Process according to claim 1, characterized in that the polymerization step is carried out at least partially at 90 to 130° C.

28. Process according to claim 1, characterized in that the polymerization step is carried out at least partially, before phase inversion, at a temperature T such that T½−20° C.<T<T½+20° C., in which T½ represents the temperature at which 50% of the initiator is decomposed in one hour.

29. Process according to claim 28, characterized in that the step is carried out at least partially at a temperature T such that T½−10° C.<T<T½+10° C.

30. Process according to claim 1, characterized in that the polymerization initiator is added to the polymerization mixture after phase inversion.

31. Process according to claim 1, characterized in that the vinylaromatic monomer is styrene.

32. Process according to claim 1, characterized in that the polymerization is carried out continuously so that the phase inversion takes place in a plug-flow reactor.

33. A composition capable of being obtained by the process of claim 1.

34. Composition according to claim 33 comprising a stable free radical which is in a free form of in a form linked to a polymer chain by a covalent bond, comprising a matrix of vinylaromatic polymer surrounding rubber nodules, characterized in that the composition comprises multi-occlusion nodules and is such that, in one of its cross-sections,

- 20 to 60% of the total area occupied by the particles corresponds to particles having a diameter ranging from 0.1 to 1 μm,
- 5 to 20% of the total area occupied by the particles corresponds to particles having a diameter ranging from 1 to 1.6 μm, and
- 20 to 75% of the total area occupied by the particles corresponds to particles having a diameter of greater than 1.6 μm.

35. Composition according to claim 34, characterized in that:

- in the 0.1 to 1 μm size range, more than 95% of the particles have the salami or capsule morphology,
- in the 1 to 1.6 μm size range, more than 95% of the particles have the salami morphology, and
- in the greater than 1.6 μm size range, more than 95% of the particles have the salami morphology.

36. Composition according to claim 34, characterized in that

- in the 0.1 to 1 μm size range, more than 95% of the particles have the capsule or onion or labyrinth morphology,
- in the 1 to 1.6 μm size range, more than 95% of the particles have the onion or labyrinth morphology, and
- in the greater than 1.6 μm size range, more than 95% of the particles have the labyrinth morphology.

37. Composition according to claim 33 characterized in that the distribution of the diameters of nodules is bimodal.

38. Composition according to claim 33, characterized in that the melt index at 210° C. with 5 kg is greater than 15 g/10 min (ISO 1133 H), the Vicat softening temperature (1 kg) is greater than 94° C. (ISO 306 A50) and the notched Izod impact strength is greater than 8 kJ/m2 (ISO 180/1A).

39. Composition according to claim 33, characterized in that the Vicat softening temperature (1 kg) is greater than 94.5° C. and the notched Izod impact strength is greater than 9 kJ/m$^2$.

40. Case for a television of a video recorder or a computer or a printer or a fax machine produced by injection molding a composition of claim 34.

41. Composition according to claim 33, characterized in that the composition is such that, in one of its cross-sections, at least 90% of the total area occupied by the particle corresponds to capsules having a diameter ranging from 0.1 to 1 μm.

* * * * *